J. KARITZKY.
TOGGLE.
APPLICATION FILED MAR. 20, 1917.

1,291,541.

Patented Jan. 14, 1919.

INVENTOR
John Karitzky
BY
Alan M. Johnson
ATTORNEY

UNITED STATES PATENT OFFICE.

JOHN KARITZKY, OF GARWOOD, NEW JERSEY, ASSIGNOR TO GARWOOD COMPANY, A CORPORATION OF NEW JERSEY.

TOGGLE.

1,291,541.  Specification of Letters Patent.  Patented Jan. 14, 1919.

Application filed March 20, 1917. Serial No. 156,108.

*To all whom it may concern:*

Be it known that I, JOHN KARITZKY, a citizen of the United States, residing at Garwood, in the county of Union and State of New Jersey, have invented certain new and useful Improvements in Toggles, of which the following is a specification, taken in connection with the accompanying drawing.

My invention relates to toggles and more particularly to one which will give the maximum strength and efficiency with a head of minimum cross section. It further relates to a head for a toggle in which a nut may be held securely yet removably in the head in the absence of the bolt. It further relates to certain details of construction which will be more fully hereinafter described and claimed.

In the accompanying drawing, I have shown an illustrative embodiment of my invention in which the same reference numerals refer to similar parts in the several figures.

Figure 1:
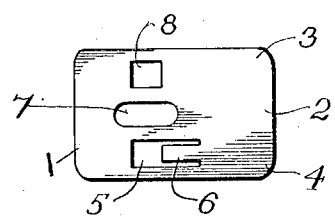
Figure 1 is a plan view of a blank, from which the head of the toggle is made.
Figure 2:
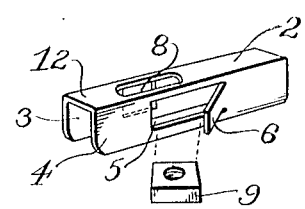
Fig. 2 is a perspective view of the head of the toggle, made from the blank of Fig. 1, showing the tongue bent out ready to receive the nut.

In the illustrative embodiment of this invention shown in the drawing, 1 is a blank formed of some sheet metal and provided with a central or body portion 2, side portions 3 and 4, the portion 4 having a slot 5 and a tongue 6. The central portion is provided with a slot 7 while the side portion 3 is provided with a slot 8. The blank is bent as shown in Fig. 2 wherein the side member 4 becomes a side strengthening flange, while the member 3 becomes the other strengthening flange.

The tongue 6 is bent out in any suitable manner, during the manufacture of the blank 1, or otherwise, so as to permit the insertion of a nut 9 into the slot 5 permitting a portion of it to engage with the slot 8. The tongue 6 is then bent back, in any suitable manner, as shown in the other figures when it will hold the nut 9 securely yet removably in the head in the absence of the bolt until such time as may be desirable, for any reason, to remove the nut. This can be done by bending out the tongue 6 and permitting the nut 9 to drop out. Ordinarily, however, the nut is placed within the head by the manufacturer or the user and the tongue is then pressed back.

In shipping the nut 9 may be securely held in the head 12, ready for immediate coöperation with the bolt 13.

Figure 3:
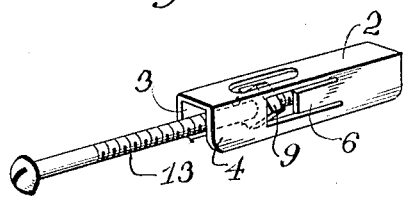
Fig. 3 is a perspective view showing the nut in place and coöperating with the bolt.
Figure 5:
Fig. 5 is a fragmentary detail sectional view of a modification.
Figure 4:
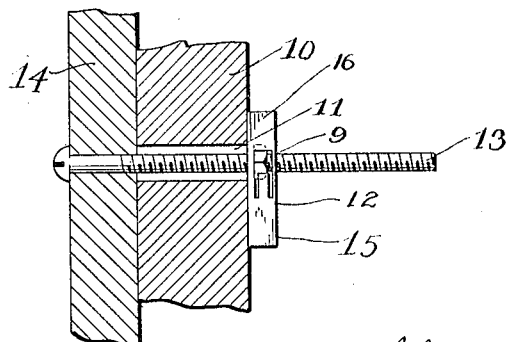
Fig. 4 is a vertical section through the support and the work to be supported showing the toggle in side elevation.

The support 10, of any suitable material, can be provided with a hole 11 of minimum cross section, just sufficient to permit the free passage of the toggle head 12. By passing the bolt 13 through the work 14 and permitting it to engage with the nut 9, as for example in Fig. 3, the toggle head 12 can be passed through the hole 11 until it is behind the support 10, when the end 15 will overbalance the end 16 and cause the toggle head 12 to drop as shown in Fig. 4, the head pivoting upon the nut 9. By then rotating the bolt 13 the work 14 is held securely to the support 10.

Of course it is to be understood that when I refer to a slot 8 in the flange 3 and to an indentation such as 17 in the flange 3, these are simply two examples of any nut engaging means which I have shown for purposes of illustration.

My invention is adapted for toggles of all sizes and to carry any load. For any given load my toggle is of relatively small diameter requiring only the minimum size hole to be drilled, and is of comparatively great holding power owing to its structure wherein the metal of the toggle head is left at points of greatest strain, the toggle head acting as a beam across the opening of the hole. It is particularly adapted for fine work, as in plumbing, where only a hole of very small diameter can be drilled in the support and yet great strength must be insured.

The bolt 13 may be of any approved construction. Ordinarily I use, what is known as a stove bolt. These bolts may be sold either with the toggle head, or the toggle heads may be sold separately either with or without the nut 9.

Having thus described this invention in connection with several illustrative embodiments thereof, to the details of which I do not desire to be limited except as required by the scope of the appended claims, what is claimed as new and what is desired to secure by Letters Patent is set forth in the appended claims.

1. In a toggle having a head the combination of a polylateral nut having plane sides held securely yet removably in the head in the absence of the bolt, and means integral with the head to removably hold the polylateral nut in the head.

2. In a toggle having a head the combination of a quadrilateral nut having plane sides held securely yet removably in the head in the absence of the bolt, and means integral with the head to removably hold the quadrilateral nut in the head.

3. In a toggle the combination of a head provided with pivoting surfaces, a quadrilateral nut having plane sides pivoted on said pivoting surfaces, and means integral with the head to removably hold the quadrilateral nut in the head without the aid of a bolt.

4. In a toggle the combination of a head provided with pivoting surfaces, a polylateral nut having plane sides and pivoted on said pivoting surfaces and means integral with the head to removably hold the polylateral nut in the head without the aid of a bolt.

5. In a toggle bolt the combination of a rigid head provided with bearing surfaces to coöperate with a quadrilateral nut having plane sides, a quadrilateral nut, and means integral with the head to removably hold the quadrilateral nut in the head in the absence of a bolt.

6. In a toggle bolt the combination of a rigid head provided with bearing surfaces to coöperate with a quadrilateral nut having plane sides, a quadrilateral nut, yielding means integral with the head to removably hold the quadrilateral nut in the head in the absence of a bolt.

7. A head for a toggle bolt provided with rigid side strengthening flanges provided with bearing surfaces to coöperate with the edge of a polylateral nut, a polylateral nut pivotally mounted on its edge on said bearing surfaces, and means integral with the head to removably hold the polylateral nut on said bearing surfaces in the absence of a bolt.

JOHN KARITZKY.

Witnesses:
  HENRY W. PLEISTED,
  DAVID TULLOCH.

Copies of this patent may be obtained for five cents each, by addressing the "Commissioner of Patents, Washington, D. C."